United States Patent
Lin et al.

(10) Patent No.: US 12,366,912 B2
(45) Date of Patent: Jul. 22, 2025

(54) ACTIVATION OF INTEGRATED GRAPHICAL PROCESSING UNITS

(71) Applicant: Hewlett-Packard Development Company, L.P., Spring, TX (US)

(72) Inventors: Chia-Cheng Lin, Taipei (TW); Hsin-Jen Lin, Taipei (TW); Heng-Fu Chang, Taipei (TW); Chao-Shen Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 25 days.

(21) Appl. No.: 18/555,478

(22) PCT Filed: Jun. 29, 2021

(86) PCT No.: PCT/US2021/039484
§ 371 (c)(1),
(2) Date: Oct. 13, 2023

(87) PCT Pub. No.: WO2023/277869
PCT Pub. Date: Jan. 5, 2023

(65) Prior Publication Data
US 2024/0184354 A1 Jun. 6, 2024

(51) Int. Cl.
*G06F 1/32* (2019.01)
*G06F 1/3212* (2019.01)
*G06F 1/3287* (2019.01)

(52) U.S. Cl.
CPC .......... *G06F 1/3287* (2013.01); *G06F 1/3212* (2013.01)

(58) Field of Classification Search
CPC .............................. G06F 1/3287; G06F 1/3212
See application file for complete search history.

(56) References Cited

U.S. PATENT DOCUMENTS

| | | | |
|---|---|---|---|
| 6,864,891 B2 | 3/2005 | Myers | |
| 7,502,947 B2 | 3/2009 | Chen et al. | |
| 8,564,599 B2 | 10/2013 | Niederauer et al. | |
| 9,389,875 B2 | 7/2016 | Thai et al. | |
| 10,467,981 B1* | 11/2019 | Yoon | G06T 1/20 |
| 2011/0164046 A1* | 7/2011 | Niederauer | G06F 1/3218 345/503 |
| 2013/0038615 A1* | 2/2013 | Hendry | G06T 1/20 345/502 |
| 2016/0117793 A1* | 4/2016 | Sierra | G06F 3/1438 345/502 |
| 2022/0317756 A1* | 10/2022 | Tikhostoup | G06T 1/20 |

FOREIGN PATENT DOCUMENTS

EP 2224324 A1 9/2010

* cited by examiner

*Primary Examiner* — Stefan Stoynov
(74) *Attorney, Agent, or Firm* — Quarles & Brady LLP

(57) ABSTRACT

In example implementations, an apparatus is provided. The apparatus includes an interface, an integrated graphical processing unit (GPU), a discrete GPU, and a controller. The interface is to receive a connection to an external display device. The integrated GPU and the discrete GPU are communicatively coupled to the interface. The controller is communicatively coupled to the integrated GPU and the discrete GPU and is to deactivate the discrete GPU and activate the integrated GPU in response to detection of the external display device connected to the interface.

13 Claims, 5 Drawing Sheets

ACTIVATION OF INTEGRATED GRAPHICAL PROCESSING UNITS

BACKGROUND

Computing devices have displays that are used to present graphical images and/or text. A graphical processing unit (GPU) can be used to render the images that are to be shown on the display.

Mobile devices, such as laptop computers, can have integrated displays. An integrated display can be relatively small to allow for a small form factor. However, the mobile devices can have interfaces that allow the mobile device to be connected to external displays, such as an external monitor or larger display device.

DETAILED DESCRIPTION

Examples described herein provide an apparatus and method to activate an integrated graphical processing unit (GPU) when an external display device is connected in a mobile computing device with an integrated GPU and a discrete GPU. As discussed above, mobile devices, such as laptop computers, can have integrated displays. An integrated display can be relatively small to allow for a small form factor. However, the mobile devices can have interfaces that allow the mobile device to be connected to external displays, such as an external monitor or a larger display device.

Some mobile devices may have a hybrid configuration that includes both an integrated GPU and a discrete GPU. The integrated GPU may consume less battery power but have less processing power than the discrete GPU. The discrete GPU may improve graphical performance when larger images are to be displayed on larger external monitors that are connected to the mobile device. However, the discrete GPU may consume large amounts of power, causing the battery of the mobile device to be consumed much faster than operation of the integrated GPU.

In some instances, a user may be presenting simple graphical slides that include text, and high resolution may not be important. In these instances, using the integrated GPU rather than the discrete GPU may save battery power when the mobile device is connected to an external display device.

The present disclosure provides an apparatus and method that can activate the integrated GPU or the discrete GPU when an external display device is connected to the mobile device. For example, in order to provide improved graphics performance, most mobile devices are configured to automatically activate the discrete GPU when the external display device is connected. However, the present disclosure may present options to a user to customize the operation of the GPUs when an external display device is connected to the mobile device. As a result, using the integrated GPU instead of the discrete GPU when an external display device is connected may conserve battery life for the mobile device.

Figure 1:
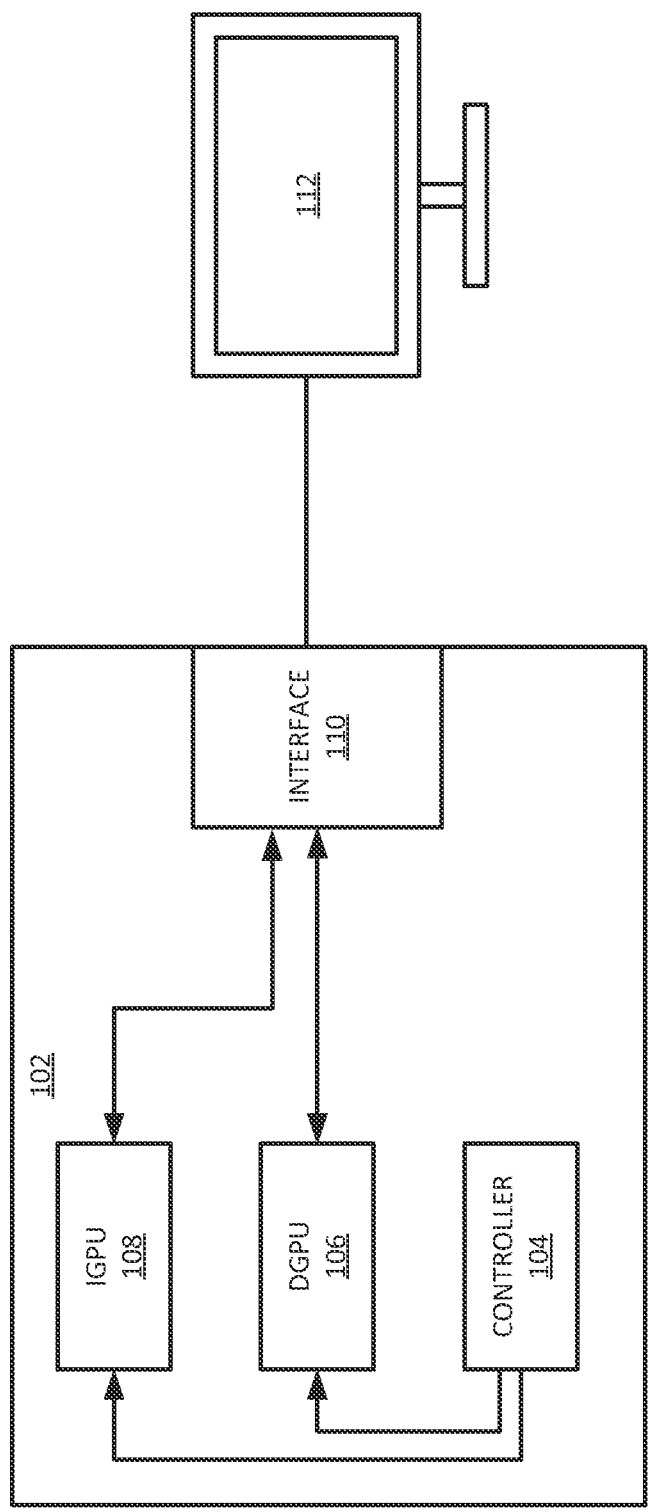
FIG. 1 is a block diagram of an example an apparatus with a hybrid graphics configuration of the present disclosure.

FIG. 1 illustrates an example apparatus 102 of the present disclosure. In an example, the apparatus 102 may be an apparatus with a hybrid graphics configuration. For example, the apparatus 102 may be a mobile device or a laptop computer that can operate on alternating current (AC) power from a wall outlet or plugged in power source or direct current (DC) power from a battery.

In an example, the apparatus 102 may include a controller 104, a discrete graphical processing unit (DGPU) 106, an integrated graphical processing unit (IGPU) 108, and an interface 110. The controller 104 may be communicatively coupled to the DGPU 106 and the IGPU 108 to control operation of the DGPU 106 and the IGPU 108.

In an example, an external display device 112 may be connected to the interface 110. The interface 110 may be any type of display connection interface. For example, the interface 110 may be universal serial bus (USB) type-C interface, a high definition media interface (HDMI), a mini display port (MDP) interface, and the like.

The interface 110 may be any type of interface that can operate to work with a hot plug detection event. For example, the interface 110 may allow the operating system of the apparatus 102 to immediately detect the external display device 112 when connected to the interface 110.

In an example, the DGPU 106 may be any third-party GPU that can be can be purchased and installed in the apparatus 102. For desktop systems, the DGPU 106 may be removed and swapped out with another DGPU 106 at any time. The DGPU 106 may be fabricated on its own printed circuit board with connection interfaces to connect to the mother board or appropriate connection interfaces of the apparatus 102. For laptop or mobile devices, the DGPU 106 can be integrated with the mother board. The DGPU 106 can provide 3D calculations. In an example, the DGPU 106 may have a direct display output port to handle display outputs.

In an example, the IGPU 108 may be any GPU that is integrated with the mother board of the apparatus 102. In other words, the IGPU 108 may be soldered onto the mother board of the apparatus 102. The IGPU 108 may not be removed without damaging the mother board of the apparatus 102. In an example, the IGPU 108 may be a GPU that is manufactured by the manufacturer of a processor or the controller 104 of the apparatus 102. For example, the IGPU 108 and the processor, or controller 104, may be manufactured by the same company to allow the IGPU 108 to work seamlessly with the processor the controller 104 and maximize performance of the IGPU 108.

As noted above, previously when the external display device 112 was connected, the DGPU 106 may be automatically activated. The DGPU 106 may consume battery life at a much higher rate than the IGPU 108. However, in some instances, the external display device 112 may be connected to share a presentation that is mostly text or simple graphics that can be shown in a lower resolution. As a result, the DGPU 106 may not be needed and battery life can be saved.

The present disclosure allows the controller 104 to deactivate the DGPU 106 and activate the IGPU 108 in response to detection of the external display device 112 being connected to the interface 110. For example, the DGPU 106 may be activated in response to the hot plug detection event when the external display device 112 is connected to the interface 110. However, based on various user settings and/or available battery capacity as discussed in further details below, the controller 104 may activate the IGPU 108 and allow the DGPU 106 to go idle. After a pre-determined amount of time being idle (e.g., 30 seconds, 1 minute, 5 minutes, and the like), the DGPU 106 may be deactivated or go to power off mode"OFF" state. As a result, the DGPU 106 may stop consuming battery power, and battery life of the battery powering the apparatus 102 may be extended.

Figure 2:
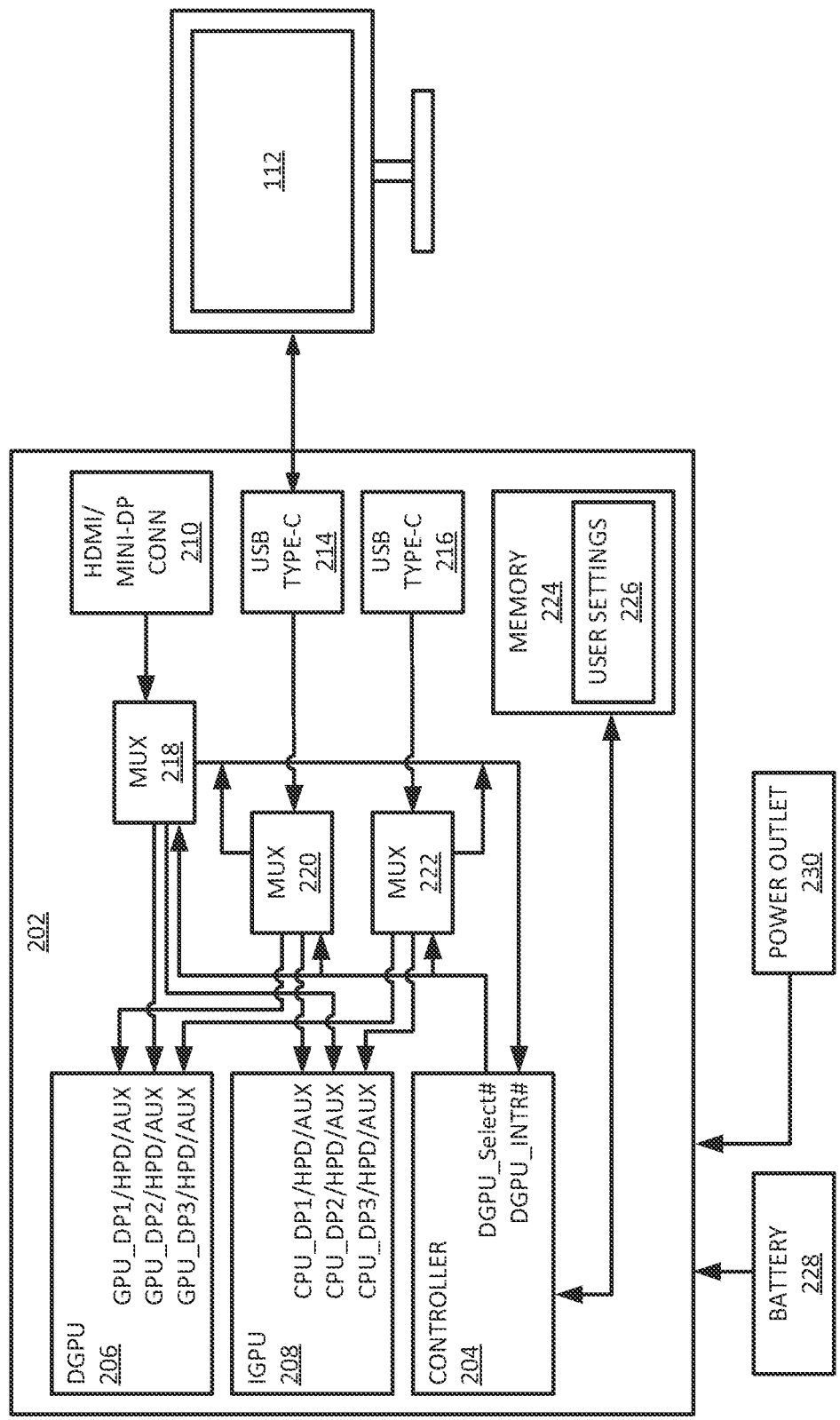
FIG. 2 is a circuit block diagram of an integrated graphical processing unit (GPU) and a discrete GPU within the apparatus of the present disclosure.

FIG. 2 illustrates a more detailed circuit diagram of an apparatus 202 that is connected to an external display device 212. FIG. 2 illustrates in further detail how a controller 104 may configure multiplexers 218, 220, and 222 to control operation of the DGPU 206 and the IGPU 208 when a hot plug detection event occurs.

In an example, the apparatus 202 may be similar to the apparatus 102. For example, the apparatus 202 may be a mobile device or a laptop computer that has a hybrid graphics configuration. The apparatus 202 may operate on power from a battery 228 (e.g., a direct current (DC) power source) or from a connection to a power outlet 230 (e.g., an alternating current (AC) power source).

The controller 204, the DGPU 206, and the IGPU 208 may be similar to the controller 104, the DGPU 106, and the IGPU 108, as described above and illustrated in FIG. 1. The external display device 212 may be similar to the external display device 112. For example, the external display device 212 may be a monitor or a projector.

FIG. 2 illustrates additional details of different types of interfaces (e.g., the interface 110) and a circuit diagram of how the interfaces are connected to the DGPU 206 and the IGPU 208. FIG. 2 also illustrates different pins on the controller 204, the DGPU 206, and the IGPU 208, and how toggling of the various pin combinations can control whether the DGPU 206 or the IGPU 208 is activated when the hot plug detection event occurs.

In an example, the apparatus 202 may include interfaces 210, 214, and 216. The interfaces 210, 214, and 216 may be different types of interfaces. For example, the interface 210 may be a high definition media interface (HDMI) port or a mini display port (DP) connection. The interface 214 may be a first universal serial bus (USB) type-C interface and the interface 216 may be a second USB type-C interface.

In an example, each interface may include several peripheral component interconnect express (PCIe) lanes. In an example, the lanes may include display port lanes that include an auxiliary channel and a hot plug detection channel. Accordingly, the DGPU 206 and the IGPU 208 may include GPU_DP1/HPD/AUX pins for each connection to a respective multiplexer (mux) 218, 220, and 222.

As shown in FIG. 2, each interface 210, 214, and 216 may be coupled to a respective multiplexer (mux) 218, 220, and 222. The multiplexers 218, 220, and 222 may be display port (DP) multiplexers. The multiplexers 218, 220, and 222 may also each be coupled to the controller 204, the DGPU 206, and the IGPU 208. The multiplexer 218, 220, and 222 may allow the controller 204 to switch between the DGPU 206 and the IGPU 208 and the interface 210, 214, or 216 that is connected to the external display device 212.

In an example each multiplexer 218, 220, and 220 may be coupled to a respective hot plug detection (HPD) pin and auxiliary (AUX) channel on the DGPU 206 and IGPU 208. For example, the multiplexer 218 may be connected to pin GPU_DP1/HPD/AUX of the DGPU 206 and pin CPU_DP1/ HPD/AUX of the IGPU 208 and the interface 210. The multiplexer 220 may be connected to pin GPU_DP2/HPD/ AUX of the DGPU 206 and pin CPU_DP2/HPD/AUX of the IGPU 208 and the interface 214. The multiplexer 222 may be connected to pin GPU_DP3/HPD/AUX of the DGPU 206 and pin CPU_DP3/HPD/AUX of the IGPU 208 and the interface 216.

In an example, the controller 204 may control the multiplexers 218, 220, and 222 to route the AUX signal and the HPD signal to either the DGPU 206 or the IGPU 208. At the same time, the controller 204 may receive the HPD signal from the multiplexer 218, 220, or 222 that detects the hot plug detection event on the respective interface 210, 214, or 216.

In an example, the controller 204 may control which graphics processor is active based on values of the DGPU_select #output. In an example, the DGPU_intr # may have an input pin and an output pin. In a normal state, DGPU_intr # the input pin may be used to reflect a current hot plug detection state. For example, the DGPU_select #output may keep track of whether the respective multiplexer 218, 220, or 222 is connected to the DGPU 206 or the IGPU 208. For example, a low value or 0 may have the respective multiplexer 218, 220, or 222 select the connection to the GPU_DP pin of the DGPU 206. A high value or 1 may have the respective multiplexer 218, 220, or 222 select the connection to the CPU_DP pin of the IGPU 208.

In an example, the DGPU_intr #input may be used to inform the controller 204 for a current state of the hot plug detection event. For example, a low value or 0 may indicate that the hot plug detection event has not been detected or that the DGPU 206 is already active. The low value may be sent to the controller 204 through the DGPU_intr #input pin. A high value or 1 may indicate that the hot plug detection event has been detected while the IGPU 208 was active. The high value may be sent to the controller 204 through the DGPU_intr #input pin. Based on the DGPU_select #value, the hot plug detect event may be routed to notify the DGPU 206 or the IGPU 208 via the mux 218, 220, or 222. If the IGPU 208 receives the hot plug detection event signal via the respective HPD input, then the IGPU 208 may be activated and the DGPU 206 may be idle. If the DGPU receives the hot plug detection event via the respective HPD input, then the DGPU 206 may be activated.

Figure 4:
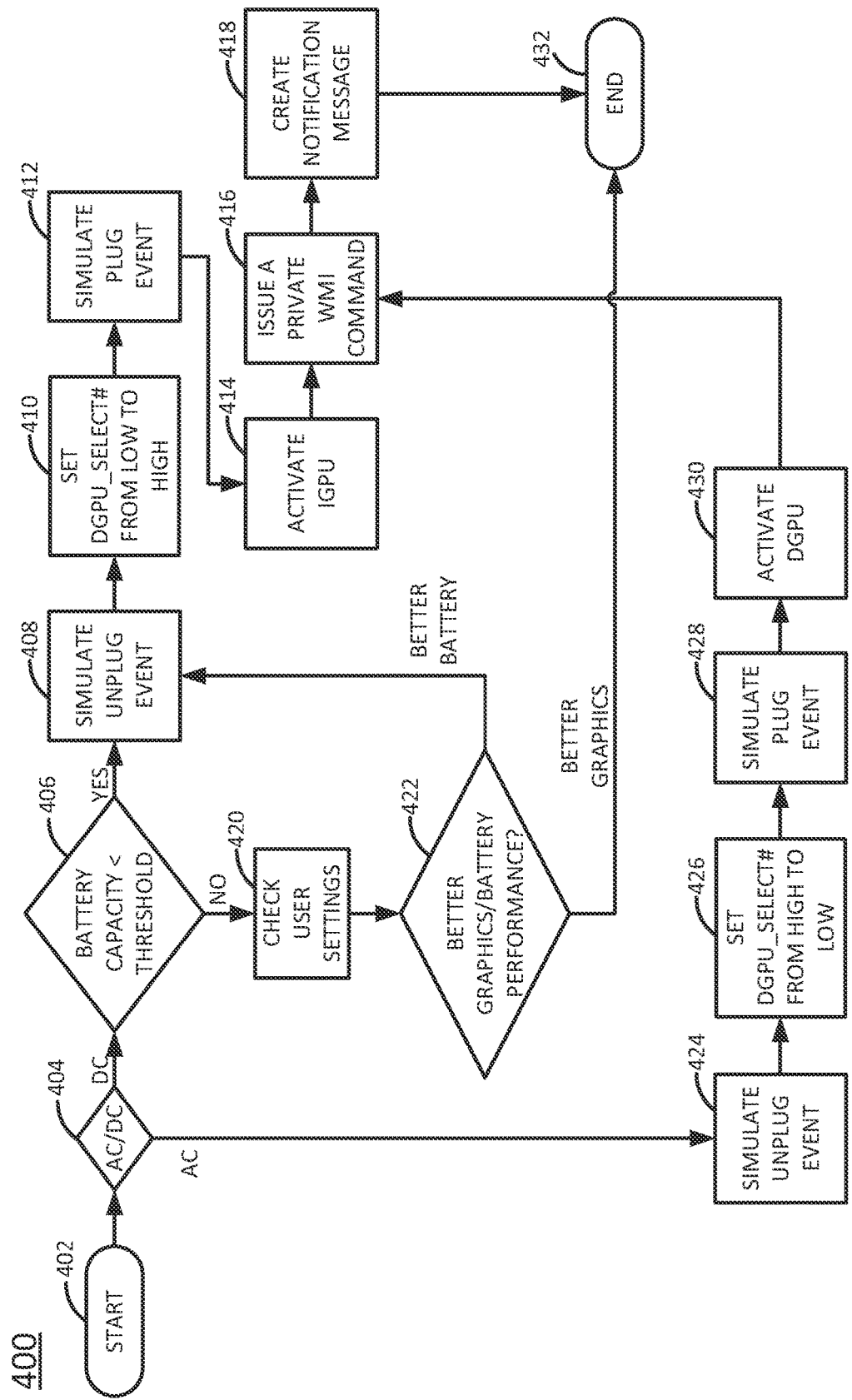
FIG. 4 is a flow chart of another example method to activate an integrated GPU in response to detection of an external display device connection of the present disclosure.

In an example, the DGPU_intr #output may generate an interrupt signal as the value is toggled from 0 to 1 when a hot plug detection event occurs (e.g., the external display device 212 is connected to one of the interfaces 210, 214, or 216). When the DGPU 206 is in an OFF sate, the interrupt signal may give the controller 204 an opportunity to interrupt the operating system and activate the DGPU 206. FIG. 4 illustrates a flow chart that describes how the values can be toggled to control operation between the DGPU 206 and the IGPU 208 using the DGPU_select #values and the input/output state of the DGPU_intr #.

In an example, the apparatus 202 may include a memory 224. The memory 224 may be any type of non-transitory computer readable medium. For example, the memory 224 may be a hard disk drive, a solid state drive, a random access memory (RAM), a read-only memory (ROM), or any combination thereof.

In an example, the memory 224 may store user settings 226. The user settings 226 may define whether the user prefers better battery performance or better graphics performance when the apparatus 202 operates on power from the battery 228. For example, the user settings 226 may be presented as a slider bar that the user can toggle left and right to set a desired balance between better graphics performance and better battery performance. In another example, the user settings 226 may be a binary option. For example, the user selects to maximize battery performance or better graphics performance.

In an example, the user settings 226 may be accessed by the controller 204 when the apparatus 202 is operating on power from the battery 228 and the battery 228 has a battery capacity greater than a threshold. For example, the threshold may be an amount of battery life that would still allow the apparatus 202 to operate the DGPU 206. As noted above, the DGPU 206 may consume large amounts of power. Thus, if the battery capacity is below the threshold, then the apparatus 202 may not have enough power to operate the DGPU 206.

In an example, the user settings 226 may be stored in a basic input/output system (BIOS) of the apparatus 202. The BIOS may be stored in the memory 224 or another private portion of the memory 224 that is not accessible by the user.

As used herein, a BIOS refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of the computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

Thus, the apparatus 202 may be configured such that the controller 204 may detect a hot plug detection event when the external display device 212 is connected to one of the interfaces 210, 214, or 216. The controller 204 may then select between the DGPU 206 or the IGPU 208 to generate the graphical content for the external display device 212. The selection may be based on whether the apparatus 202 is operating on power from the battery 228 or from the power outlet 230. The selection may also be based on the user settings 226 selected by a user (e.g., better graphics performance versus better battery performance) when the apparatus 202 operates on power from the battery 228. The controller 224 may toggle values of the DGPU_select # to select the DGPU 206 or the IGPU 208 based on the user settings 226 stored in the memory 224. The DGPU_intr # is set to an input state to indicate a current hot plug state and to issue an interrupt to the system. Thus, the present disclosure may still allow the IGPU 208 to be activated when an external display device 212 is connected to an apparatus with a hybrid graphics configuration.

Figure 3:
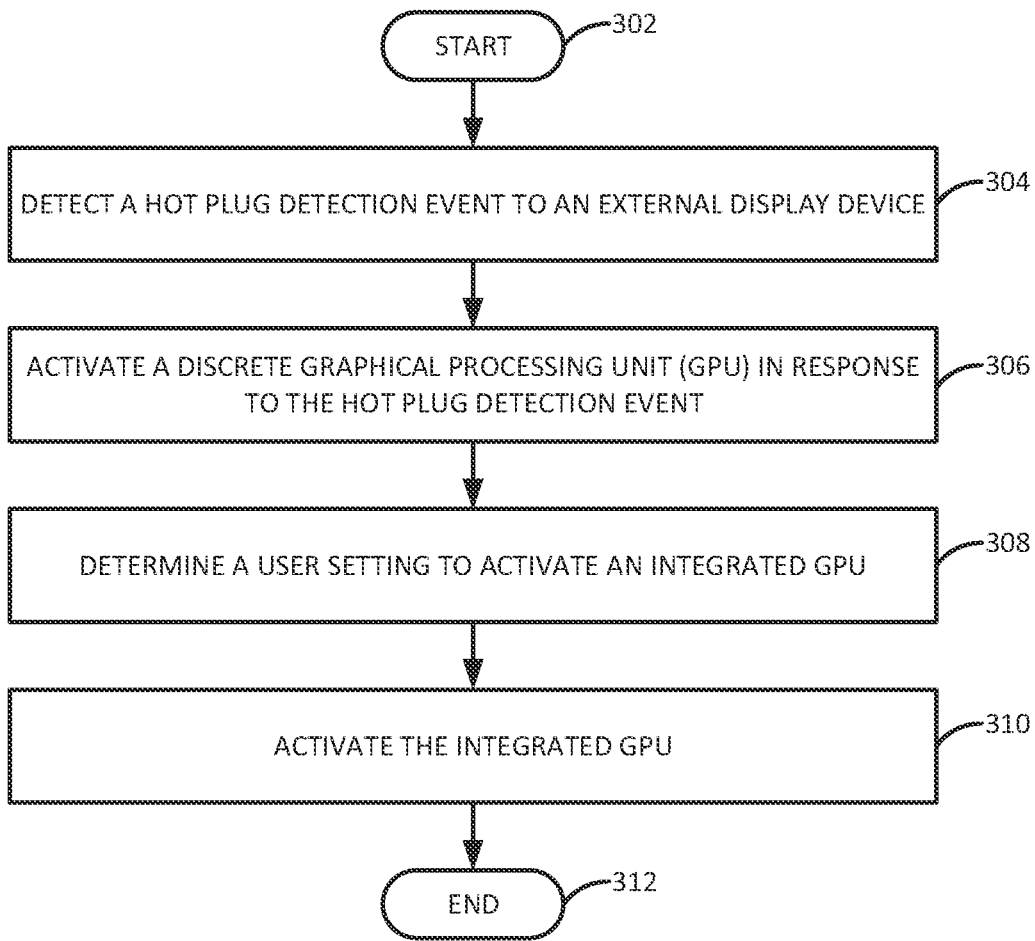
FIG. 3 is a flow chart of an example method to activate an integrated GPU in response to detection of an external display device connection of the present disclosure.

FIG. 3 illustrates a flow diagram of an example method 300 for activating an integrated GPU in response to detection of an external display device connection of the present disclosure. In an example, the method 300 may be performed by one of the apparatus 102 illustrated in FIG. 1, the apparatus 202 illustrated in FIG. 2, or the apparatus 500 illustrated in FIG. 5, and described below.

At block 302, the method 300 begins. At block 304, the method 300 detects a hot plug detection event to an external display device. For example, the external display device may be connected to an interface of a computing device or apparatus. The interface may be an HDMI interface, a mini-DP interface, a USB type-C interface, and the like.

At block 306, the method 300 activates a discrete graphical processing unit (GPU) in response to the hot plug detection event. For example, the DGPU may be activated automatically when the connection of the external display device is detected.

At block 308, the method 300 determines a user setting to activate an integrated GPU. In an example, the apparatus may be operating on battery power. Thus, to conserve battery power, the user may select settings that prioritize conservation of battery power over graphical performance.

At block 310, the method 300 activates the integrated GPU. For example, the user may have selected to have better battery performance rather than better graphics performance as indicated by the user settings determined in block 308. In response, the IGPU may be activated. In an example, when the IGPU is activated, the DGPU may be allowed to remain idle for a predetermined idle time (e.g., 30 seconds, 1 minute, 5 minutes, and the like). After a period of inactivity for the DGPU has passed, the DGPU may be powered down, deactivated into a power off mode, or placed in an "OFF" state. At block 312, the method 300 ends.

FIG. 4 illustrates a more detailed flow diagram of an example method 400 for activating an integrated GPU in response to detection of an external display device connection of the present disclosure. In an example, the method 400 may be performed by one of the apparatus 102 illustrated in FIG. 1, the apparatus 202 illustrated in FIG. 2, or the apparatus 500 illustrated in FIG. 5, and described below.

At block 402, the method 400 begins. At block 404, the method 400 determines if an apparatus with a hybrid graphics configuration is operating on alternating current (AC) or direct current (DC) power. AC power may be associated with power from a wall outlet and DC power may be associated with power from a battery.

If the apparatus is running on DC power, the method 400 may proceed to block 406. At block 406, the method 400 determines if the battery capacity is less than a threshold value. For example, the threshold value may be a remaining battery capacity threshold value where there may not be enough battery capacity to operate the discrete GPU (DGPU). For example, reaching the threshold may allow the DPGU to go to an OFF state to reduce battery power consumption. If the battery capacity is less than the threshold value, the method 400 may proceed to block 408.

At block 408, the method 400 simulates an unplug event. For example, referring to FIG. 2, the DPGU_intr # may be toggled from an input direction to an output direction.

At block 410, the method 400 sets a DGPU_select # from low to high. For example, the DGPU_select #output of the controller 204 may be set from low to high or 0 to 1. This causes the respective multiplexer 210, 214, or 216 connected to the external display device 212 to select the connection to the IGPU 208.

At block 412, the method 400 simulates a plug event. For example, the DPGU_intr # may be toggled from an output direction to an input direction. Thus, blocks 408, 410, and 412 may be performed to simulate a hot plug detection process that provides an interrupt signal to the GPU chipsets.

This may provide an opportunity for the controller 204 to select between the DGPU 206 and the IGPU 208.

At block 414, the method 400 activates the integrated GPU (IGPU). The IGPU may be activated to service the hot plug detection event and generate the graphics to the external display device. After a predetermined amount of idle time, the DGPU may go to an OFF state and power down.

At block 416, the method 400 issues a private windows management interface (WMI) command. The WMI command may be sent to a notification application being executed on the apparatus or mobile device.

At block 418, the method 400 creates a notification message. The notification message may be a pop-up message that is shown on the display to remind the user of which GPU is currently activated. For example, from block 414 the message may remind the user that the IGPU has been activated for the external display device. From block 430, as described in further detail below, the message may remind the user that the DGPU has been activated for the external display device. The method 400 may then proceed to block 432 where the method 400 ends.

Referring back to block 406, if the battery capacity is greater than the threshold value (e.g., the answer to block 406 is no), then the method 400 may proceed to block 420. At block 420, the method 400 checks the user settings. The user settings may be graphics performance and battery performance settings that can be stored in the BIOS of the apparatus. The user may set a preference for better battery performance or better graphics performance when operating on battery power and the battery capacity is above the threshold value.

At block 422, the method 400 determines if the user settings indicate a preference for better graphics performance or better battery performance. If the user settings indicate a preference for better battery performance, the method 400 may proceed to block 408 and proceed as described above. If the user settings indicate a preference for better graphics performance, the method 400 may activate the DGPU and proceed to block 432 where the method 400 ends.

Referring back to block 404, if the apparatus is operating on AC power, the method 400 may proceed to block 424. At block 424, the method 400 simulates an unplug event. For example, referring to FIG. 2, the DGPU_intr # may be toggled from an input direction to an output direction.

At block 426, the method 400 sets the DGPU_select #pin from high to low. For example, the DGPU_select #output of the controller 204 may be set from low to high or 1 to 0. This causes the respective multiplexer 210, 214, or 216 connected to the external display device 212 to select the connection to the DGPU 206.

At block 428, the method 400 simulates a plug event. For example, the DGPU_intr # may be toggled from an output direction to an input direction. Thus, blocks 424, 426, and 428 may be performed to simulate a hot plug detection process (similar to blocks 408, 410, and 412) that provides an interrupt signal to the GPU chipsets. This may provide an opportunity for the controller 204 to select between the DGPU 206 and the IGPU 208.

At block 430, the method 400 activates the DGPU. The method 400 may then proceed to block 416 and proceed to completion at block 432. At block 432, the method 400 ends.

Figure 5:
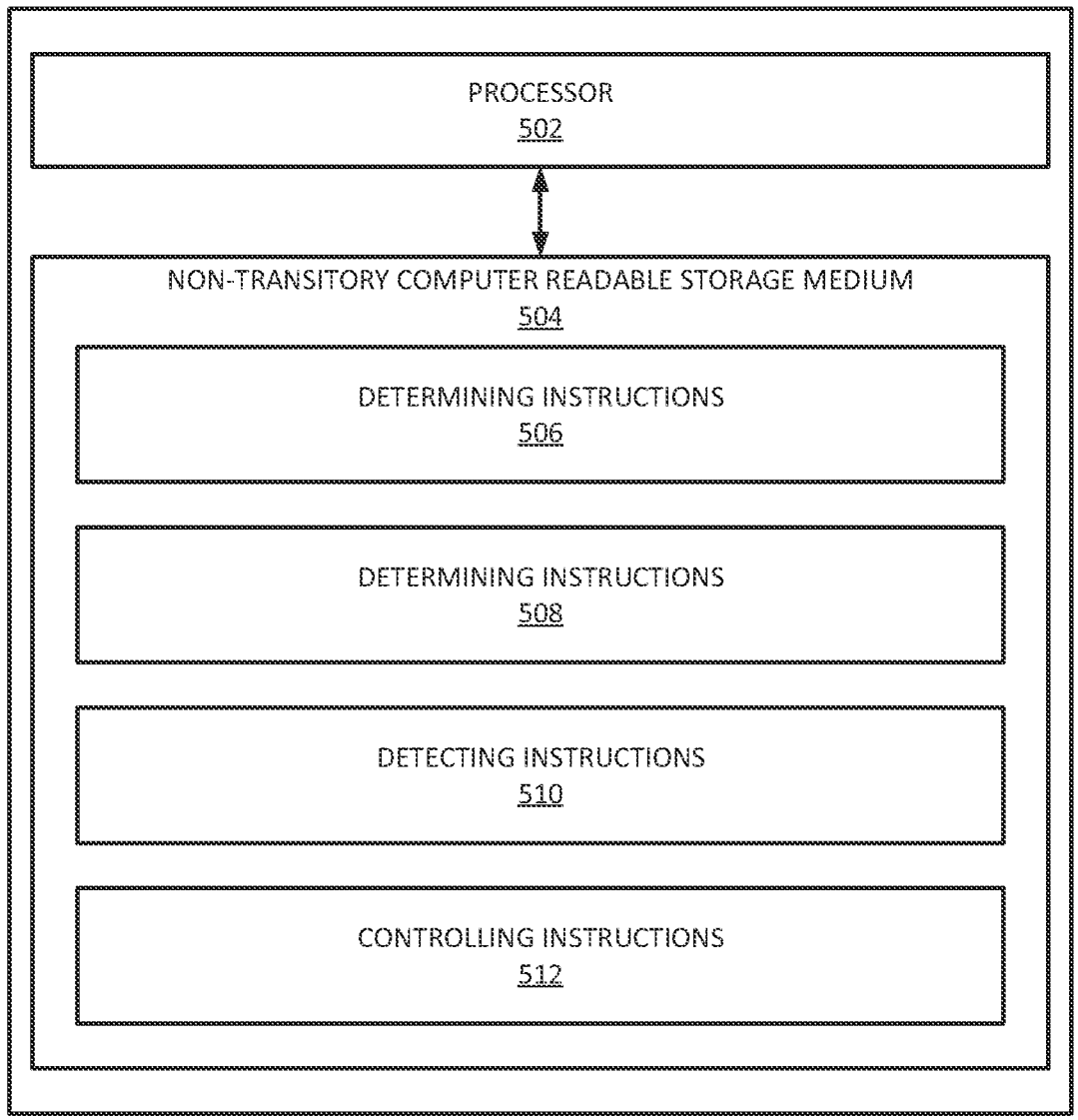
FIG. 5 is an example non-transitory computer readable storage medium storing instructions executed by a processor to perform light compensations for virtual backgrounds of the present disclosure.

FIG. 5 illustrates an example of an apparatus 500. In an example, the apparatus 500 may be the apparatus 102 or 202. In an example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In an example, the instructions 506 may include determining instructions 506. For example, the instructions 506 may determine that the apparatus is operating on battery power.

The instructions 508 may include determining instructions. For example, the instructions 508 may determine that a user setting is set to improve battery performance. For example, the user setting may be stored in a BIOS of the apparatus.

The instructions 510 may include detecting instructions. For example, the instructions 510 may detect a connection to an external display device.

The instructions 512 may include controlling instructions. For example, the instructions 512 may control a multiplexer connected to an integrated graphical processing unit (GPU) and a discrete GPU to select a connection to the integrated GPU in response to the connection to the external display device being detected. The control of the multiplexer may be based on toggling output values of a controller connected to the multiplexer. For example, the controller may use interrupt signal and a select signal to connect the multiplexer to the DGPU or the IGPU, as described above.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   an interface to receive a connection to an external display device;
   an integrated graphical processing unit (GPU) communicatively coupled to the interface;
   a discrete GPU communicatively coupled to the interface; and
   a controller communicatively coupled to the integrated GPU and to the discrete GPU,
   wherein the controller is to deactivate the discrete GPU and activate the integrated GPU in response to detection of the external display device being connected to the interface, and
   wherein the controller is to control a multiplexer communicatively coupled to the integrated GPU, the discrete GPU, and the interface to:
   select a connection to the integrated GPU in response to the connection to the external display device being detected,
   simulate an unplug event to allow the multiplexer to switch from the discrete GPU to the integrated GPU, and
   simulate a plug-in event to complete a hot plug detection cycle of the interface connected to the external display device.

2. The apparatus of claim 1, wherein the controller comprises a discrete GPU select pin and a discrete GPU interrupt pin that are communicatively coupled to the multiplexer to toggle a connection between the integrated GPU and the discrete GPU to the interface connected to the external display device.

3. The apparatus of claim 2, wherein the controller is to route an auxiliary signal and a hot plug detection event signal to the integrated GPU when the hot plug detection event signal is received from the multiplexer to activate the integrated GPU and allow the discrete GPU to go idle to be deactivated after a predetermined amount of time being idle has passed.

4. The apparatus of claim 1, further comprising:
a memory to store user settings for graphics performance and battery performance to control activation of the integrated GPU in response to the detection of the external display device being connected to the interface.

5. A method, comprising:
detecting, by a processor, a hot plug detection event to an external display device;
activating, by the processor, a discrete graphical processing unit (GPU) in response to the hot plug detection event;
determining, by the processor, a user setting to activate an integrated GPU;
activating, by the processor, the integrated GPU; and
controlling, by the processor, a multiplexer connected to the integrated GPU and the discrete GPU to:
select a connection to the integrated GPU in response to a connection to the external display device being detected,
simulate an unplug event to allow the multiplexer to switch from the discrete GPU to the integrated GPU, and
simulate a plug-in event to complete a hot plug detection cycle of an interface connected to the external display device.

6. The method of claim 5, wherein the discrete GPU is deactivated into a power off mode after a period of inactivity while the integrated GPU is activated.

7. The method of claim 5, wherein the user setting is based on a mobile device of the processor being powered by a battery and a battery life of the battery is below a battery life threshold.

8. The method of claim 5, wherein a basic input/output system (BIOS) control of the discrete GPU and the integrated GPU is based on the user setting.

9. The method of claim 5, wherein the activating comprises:
switching, by the processor, a connection of a multiplexer to an interface connected to the external display device from the discrete GPU to the integrated GPU.

10. A non-transitory computer readable storage medium encoded with instructions which, when executed, cause a processor of an apparatus to:
determine that the apparatus is operating on battery power;
determine that a user setting is set to improve battery performance;
detect a connection to an external display device; and
control a multiplexer connected to an integrated graphical processing unit (GPU) and a discrete GPU to:
select a connection to the integrated GPU in response to the connection to the external display device being detected,
simulate an unplug event to allow the multiplexer to switch from the discrete GPU to the integrated GPU, and
simulate a plug-in event to complete a hot plug detection cycle of an interface connected to the external display device.

11. The non-transitory computer readable storage medium of claim 10, wherein the instructions further cause the processor to:
generate a notification to remind a user that the integrated GPU is active and provide an option to activate the discrete GPU.

12. The non-transitory computer readable storage medium of claim 10, wherein a discrete GPU interrupt signal on a controller is toggled from an input direction to an output direction to simulate the unplug event and toggled from the output direction to the input direction to simulate the plug-in event.

13. The non-transitory computer readable storage medium of claim 10, wherein a discrete GPU select signal on a controller is toggled from low to high to switch the multiplexer from the discrete GPU to the integrated GPU.

* * * * *